United States Patent
Walker et al.

(10) Patent No.: US 8,015,785 B2
(45) Date of Patent: Sep. 13, 2011

(54) COMBINATION GRASS DISCHARGE AND MULCH PLUG INSERT APPARATUS AND METHOD FOR A LAWNMOWER

(75) Inventors: Christopher T. Walker, Hillsborough, NC (US); Christopher W. Vaughn, Mebane, NC (US); Vincent Andrew Prinzo, Hillsborough, NC (US)

(73) Assignee: Honda Motor Co., Ltd., Tokyo (JP)

( * ) Notice: Subject to any disclaimer, the term of this patent is extended or adjusted under 35 U.S.C. 154(b) by 150 days.

(21) Appl. No.: 12/463,800

(22) Filed: May 11, 2009

(65) Prior Publication Data

US 2010/0281838 A1    Nov. 11, 2010

(51) Int. Cl.
*A01D 67/00* (2006.01)
(52) U.S. Cl. .................................. 56/320.2; 56/202
(58) Field of Classification Search ............ 56/202, 56/320.2, 255, 17.5, 17.1, 17.3
See application file for complete search history.

(56) References Cited

U.S. PATENT DOCUMENTS

| | | | |
|---|---|---|---|
| 3,085,386 A * | 4/1963 | Slemmons ..................... 56/13.4 |
| 3,872,656 A * | 3/1975 | Dahl ................................ 56/202 |
| 4,189,903 A * | 2/1980 | Jackson et al. ................. 56/255 |
| 4,312,174 A | 1/1982 | Vanderhoef | |
| 4,326,370 A * | 4/1982 | Thorud ............................ 56/202 |
| 4,435,949 A | 3/1984 | Heismann | |
| 4,951,449 A | 8/1990 | Thorud | |
| 5,090,183 A | 2/1992 | Thorud et al. | |
| 5,442,902 A | 8/1995 | Mosley et al. | |
| 5,499,494 A * | 3/1996 | Boshell et al. ................ 56/320.1 |
| 6,085,508 A * | 7/2000 | Miatt et al. ...................... 56/17.1 |
| 6,195,969 B1 | 3/2001 | Yilmaz | |
| 6,735,932 B2 * | 5/2004 | Osborne ....................... 56/320.1 |
| 6,751,937 B2 * | 6/2004 | Kobayashi et al. .............. 56/202 |
| 6,862,874 B2 * | 3/2005 | Seegert ............................ 56/202 |
| 6,971,224 B1 * | 12/2005 | Hancock ....................... 56/320.2 |
| 6,990,793 B2 | 1/2006 | Osborne et al. | |
| 7,051,504 B2 | 5/2006 | Osborne | |
| 7,574,852 B1 * | 8/2009 | Loxterkamp et al. ......... 56/320.2 |
| 2003/0182919 A1 * | 10/2003 | Baumann et al. ............. 56/320.1 |
| 2004/0168424 A1 * | 9/2004 | Baumann et al. ............. 56/320.1 |

FOREIGN PATENT DOCUMENTS

WO    WO 94/10827    5/1994

* cited by examiner

*Primary Examiner* — Arpad Fabian-Kovacs
(74) *Attorney, Agent, or Firm* — Jenkins, Wilson, Taylor & Hunt, P.A.

(57) ABSTRACT

A combination grass discharge and mulch plug insert apparatus and method are provided where the insert can include a first end configured for communication with a discharge opening of a lawnmower and a second end also configured for communication with the discharge opening. The first end can be configured for preventing discharge of grass clippings from the lawnmower, whereas the second end can be configured for allowing discharge of grass clippings through the second end. Further, the insert can be reversible such that it can be oriented in either a first position in which the first end is inserted into the discharge opening or a second position in which the second end is attached to the discharge opening. As a result, the lawnmower can be easily converted between mulching and side- or rear-discharge modes of operation.

20 Claims, 4 Drawing Sheets

COMBINATION GRASS DISCHARGE AND MULCH PLUG INSERT APPARATUS AND METHOD FOR A LAWNMOWER

TECHNICAL FIELD

The subject matter disclosed herein relates generally to operational accessories for use with power equipment such as a lawnmower. More particularly, the subject matter disclosed herein relates to apparatuses and methods for use with lawnmowers that can change the mode of operation for a lawnmower convertible between mulching and side- or rear-discharge modes.

BACKGROUND

A number of options exist for managing grass clippings produced by a lawnmower. One option is to collect the clippings in a bag or other container and remove the clippings. Bagging has the advantage of removing clippings from a lawn entirely, leaving a very clean-looking lawn. Bagging does require, however, time to empty the bag and dispose of the clippings. In addition, removing the clippings from the lawn can deprive the remaining grass of the benefit of the nutrients contained in the clippings (e.g., nitrogen, water). As a result, additional fertilizer treatments may be needed to account for the removal of these nutrients.

Another option is to discharge the grass clippings away from the lawnmower. This option requires less equipment (e.g., bagging system), and eliminates the need to empty bags. Rather, the clippings can just be left to fertilize the yard. If the grass clippings are relatively short, this option can provide aesthetically acceptable results, but if the clippings are too long, however, they can be considered unsightly when left on the lawn. Alternatively, the clippings can be collected after the fact, but such collection creates many of the same problems as bagging with regard to disposing of the clippings.

A third option is to mulch the clippings for reincorporation into the lawn, thereby eliminating the need to dispose of grass clippings. In addition, mulching can help to provide the soil with increased ground cover to hold moisture, and the mulched clippings can act as a fertilizer. There are also disadvantages, however, to mulching systems. For instance, mulching can require special blades or a specifically-designed housing shape. Also, if the grass is particularly tall, thick, or wet, mulching systems can put high strains on the lawnmower because of the high volume and/or high density of the clippings.

Because each of these options has distinct advantages and disadvantages, it is desirable for a lawnmower to be convertible between multiple modes to allow the operator to select the mode of operation best suited for a particular situation. Such convertible designs have been developed, but most designs require the attachment of separate components to use the lawnmower in a side or rear discharge mode (e.g., an attachable discharge chute) or in a mulching mode (e.g., a mulch plate or mulch plug). Thus, an operator needs to remove one accessory and attach another to change operating modes. Other designs use movable flaps to alternately block and unblock a discharge opening, but these designs can be less effective at performing the desired functions, whether bagging, mulching, or side discharge (including actual left or right side discharge or rear discharge), than components that are dedicated to the particular mode of operation. Accordingly, no current design allows for an easy, convenient, and effective mechanism for changing a lawnmower between operating modes.

SUMMARY

In accordance with this disclosure, both an apparatus and method for changing the mode of operation for a lawnmower are provided. In one aspect, a combination grass discharge and mulch plug insert is provided, and it can include a first end configured for communication with a discharge opening of a lawnmower and a second end also configured for communication with the discharge opening. The first end can be configured for preventing discharge of grass clippings from the lawnmower, whereas the second end can be configured for allowing discharge of grass clippings through the second end. Further, the insert can be reversible such that it can be oriented in either a first position in which the first end is inserted into the discharge opening or a second position in which the second end is attached to the discharge opening. As a result, the lawnmower can be easily converted between mulching and side/rear discharge modes of operation.

Some of the objects of the subject matter disclosed herein having been stated hereinabove, and which are achieved in whole or in part by the presently disclosed subject matter, other objects will become evident as the description proceeds when taken in connection with the accompanying drawings as best described hereinbelow

BRIEF DESCRIPTION OF THE DRAWINGS

The features and advantages of the present subject matter will be more readily understood from the following detailed description which should be read in conjunction with the accompanying drawings that are given merely by way of explanatory and non-limiting example, and in which.

DETAILED DESCRIPTION

Figure 1:
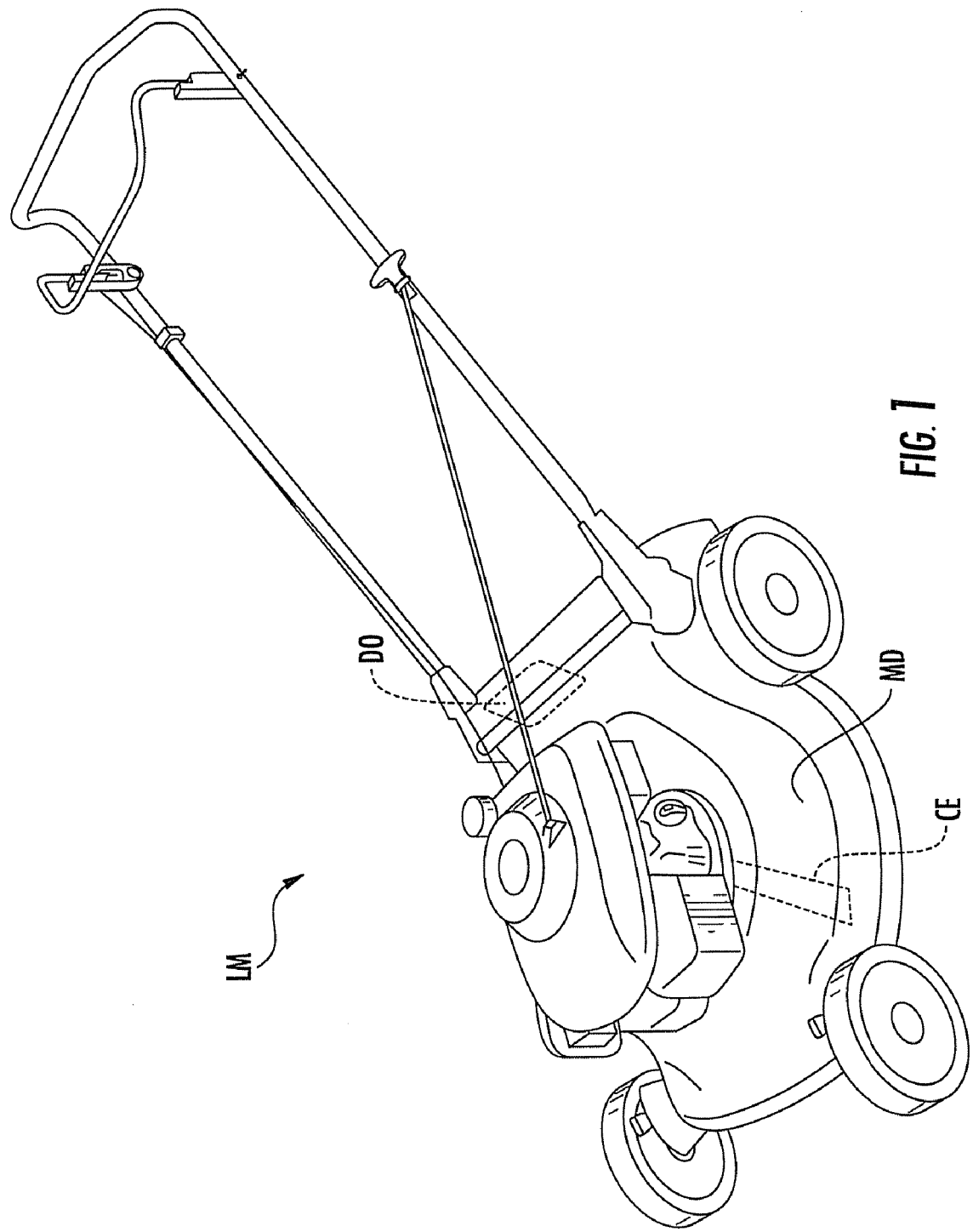
FIG. 1 is a perspective view of a lawnmower including a combination grass discharge and mulch plug insert according to an embodiment of the presently disclosed subject matter.

The present subject matter provides a combination grass discharge and mulch plug insert for a lawnmower. In one aspect, the present subject matter provides an insert for use with a lawnmower, generally designated LM, which is shown for example in FIG. 1. Lawnmower LM can include a housing, such as a mower deck MD, which can include front, side, rear, upper exterior, and lower interior portions. A suitable cutting element CE (e.g., a blade or blades) can be disposed within the lower interior portion of mower deck MD, and a discharge opening DO in mower deck MD can provide access to the lower interior portion of mower deck MD through either a side or rear portion.

Figure 2A:
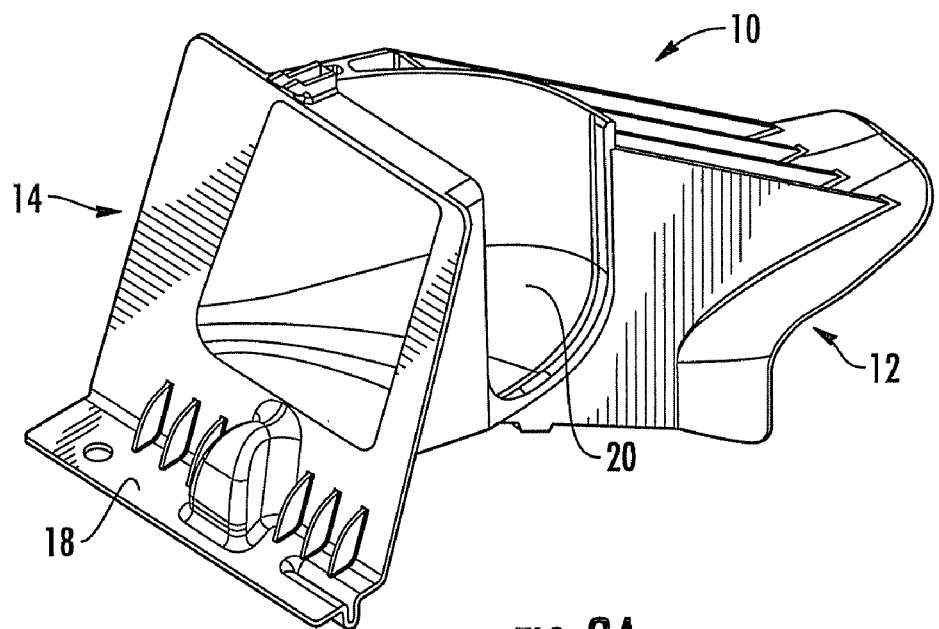
FIGS. 2A and 2B are perspective views of the combination grass discharge and mulch plug insert according to an embodiment of the presently disclosed subject matter.
Figure 2B:
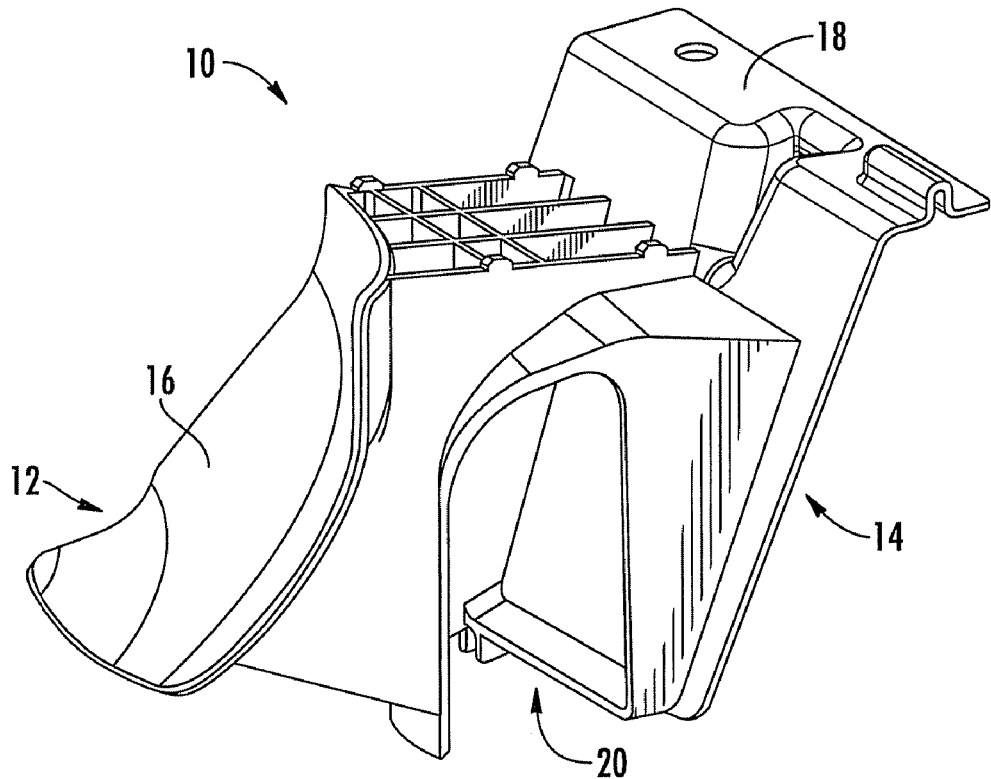

An insert according to the present subject matter, generally designated 10, is shown for example in FIGS. 2A and 2B. Insert 10 can be a one-piece component composed of a single material, such as a plastic. Insert 10 can have a first end 12 and a second end 14, each end configured for connection with discharge opening DO of lawnmower LM. Specifically, first end 12 can be configured for preventing grass clippings from being discharged through discharge opening DO of lawnmower LM, whereas second end 14 can be configured for allowing discharge of grass clippings out of discharge opening DO through second end 14. Accordingly, insert 10 can be reversible such that it can be oriented in either a first position in which first end 12 is attached to or inserted into discharge opening DO, or a second position in which second end 14 is attached to discharge opening DO.

Figure 3A:
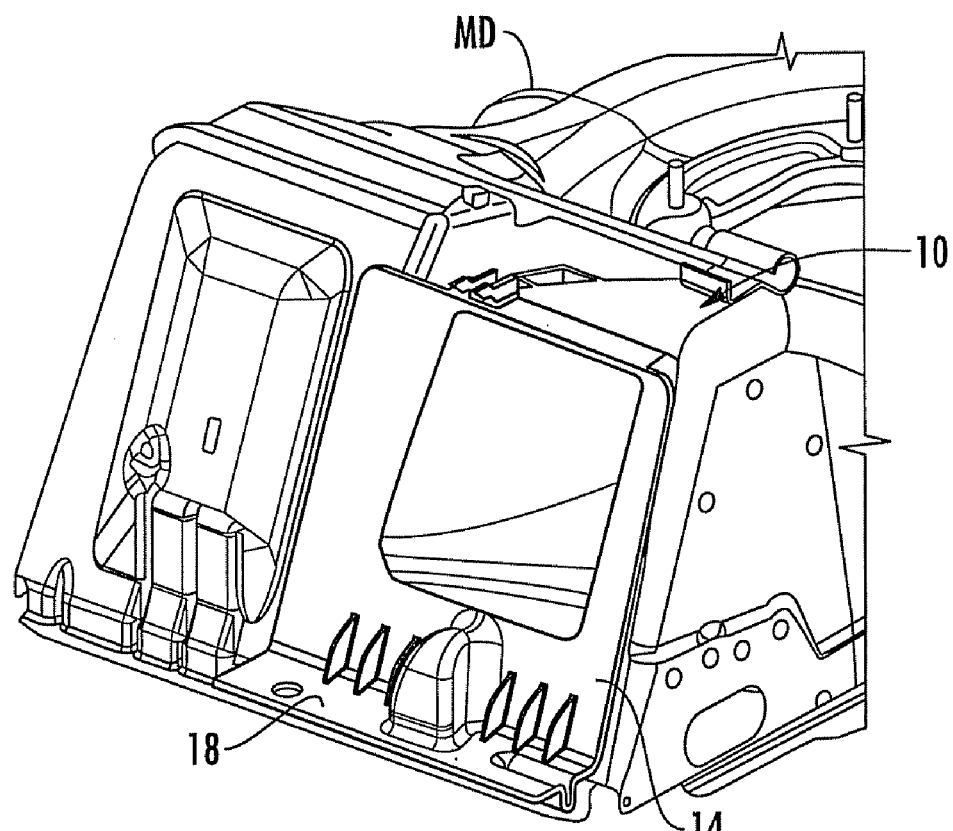
FIGS. 3A and 3B are perspective views of the combination grass discharge and mulch plug insert in a first position with respect to the lawnmower.
Figure 3B:
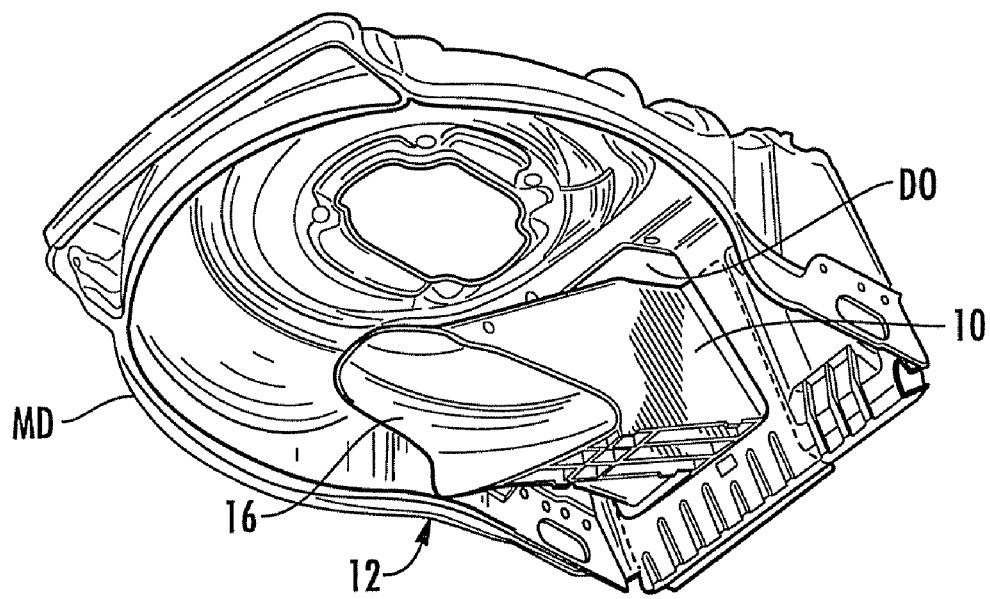

For instance, with reference to FIGS. 3A and 3B, when an operator wishes to operate lawnmower LM in a mulching mode, insert 10 can be oriented in the first position in which first end 12 is attached to or inserted into discharge opening DO. In one specific example shown in FIGS. 3A and 3B, insert 10 can be passed into discharge opening DO such that it is at least partially within mower deck MD. The shape of insert 10 can be designed so that when it is oriented in the first position, discharge opening DO is substantially obstructed, preventing at least a majority of the grass clippings from being expelled away from mower deck MD. In this way, lawnmower LM can be operated as a mulching mower, recycling the grass clippings back into the lawn below mower deck MD.

Further, the lower interior portion of mower deck MD can have a shape that is specifically designed to create desirable airflow patterns within mower deck MD. In particular, the lower interior portion can be shaped such that grass clippings are directed towards discharge opening DO. Correspondingly, first end 12 can include a shaped surface 16 that is complementary to the shape of the lower interior portion of mower deck MD. For example, the shape of shaped surface 16 can match the contour of the lower interior portion of mower deck MD. Complementarily shaped surface 16 can thus serve to create a substantially seamless surface with the lower interior portion and help to change the airflow patterns within lower interior portion during operation of lawnmower LM. In this way, the obstruction of discharge opening DO by insert 10 will not result in any imbalance in the flow of air and grass clippings within mower deck MD.

Insert 10 can further include a flange 18 that can be used for securing insert 10 to mower deck MD. For instance, as can be seen in FIGS. 3A and 3B, when insert 10 is oriented in the first position, flange 18 can extend from second end 14 and brace insert 10 against mower deck MD. In addition, flange 18 can attach to mower deck MD using any of a variety of mechanisms known in the art. For example, flange 18 can include one or more surface features that can interlock (e.g., snap together) with corresponding surface features on mower deck MD. Alternatively, one or more fasteners can be used to affix flange 18 to mower deck MD. Regardless of the method of attachment, flange 18 can help to retain insert 10 in place when it is located in the first position.

Figure 4A:
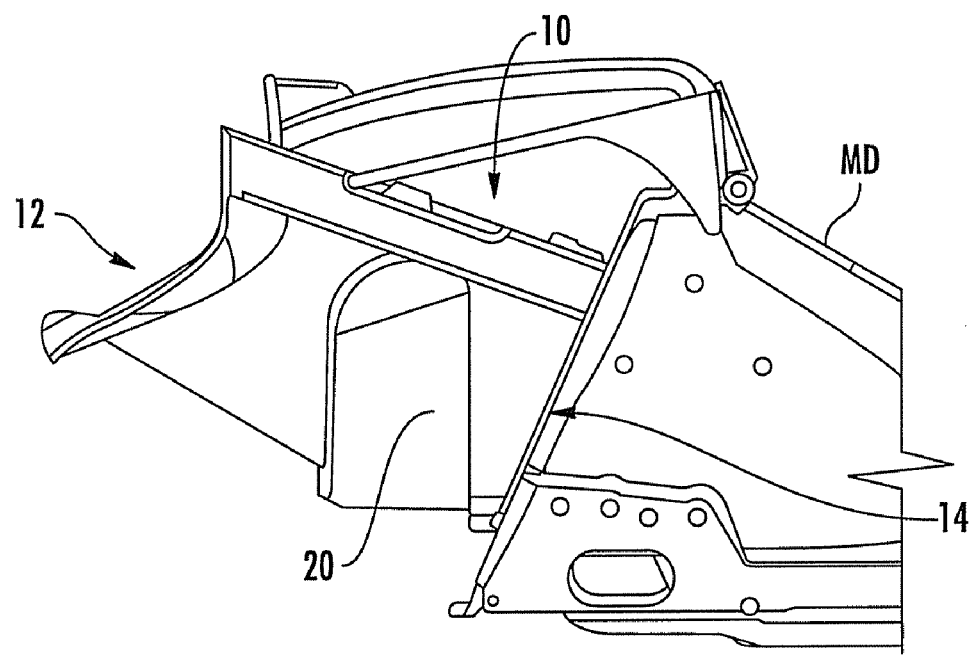
FIGS. 4A and 4B are perspective views of the combination grass discharge and mulch plug insert in a second position with respect to the lawnmower.
Figure 4B:
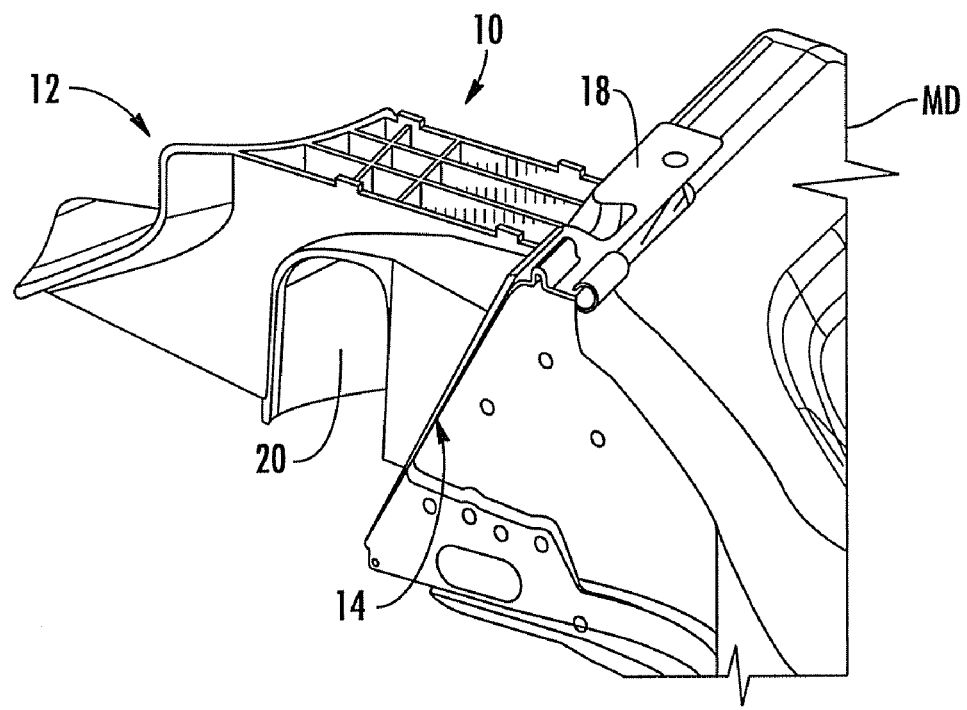

As noted above, however, insert 10 is not limited to being used as a mulch plug. With reference to FIGS. 4A and 4B, when an operator wishes to operate lawnmower LM in a grass discharge mode (e.g., side- or rear-discharge), insert 10 can be oriented in the second position (e.g., inverted from first position) in which second end 14 is attached to discharge opening DO. For instance, as is shown in FIGS. 4A and 4B, insert 10 can be positioned against mower deck MD such that second end 14 is in communication with discharge opening DO. In contrast to first end 12, however, second end 14 does not in this position obstruct discharge opening DO, and therefore grass clippings can pass through discharge opening DO to be expelled away from mower deck MD.

In addition, insert 10 can further include a discharge chute 20 in communication with second end 14 for directing the discharge of grass clippings away from mower deck MD. As a result, second end 14 defines a passage for allowing discharge of grass clippings through second end 14. For instance, as can be seen in FIGS. 2A, 2B, 4A, and 4B, discharge chute 20 can be formed within the body of insert 10. In particular, discharge chute 20 can be a curved channel formed within a central portion of insert 10 that extends between second end 14 and a side of insert 10. In this configuration, when insert 10 is oriented in the second position, grass clippings can be directed out of discharge opening DO, through second end 14, and through discharge chute 20 to be expelled away from mower deck MD. For instance, discharge chute 20 can be designed so that the grass clippings are directed toward the rear and/or side of lawnmower LM. In this way, the grass clippings can be discharged away from the operator and away from the path of lawnmower LM. It should be noted that although insert 10 is shown in FIGS. 4A and 4B with reference to a rear discharge lawnmower, a person skilled in the art would understand that insert 10 can be used with any other suitable type of a lawnmower, such as, for example, a side discharge lawnmower.

Similarly to the way insert 10 can be secured to mower deck MD when it is in the first position, insert 10 can likewise be secured to mower deck MD when it is in the second position. In fact, flange 18 can again be used for securing insert 10 to mower deck MD. For instance, as can be seen in FIGS. 4A and 4B, when insert 10 is oriented in the second position, flange 18 can extend from second end 14 to support insert 10 on mower deck MD. For instance, insert 10 can be designed such that when it is oriented in the second position, flange 18 contacts a portion of mower deck MD above discharge opening DO. In this way, flange 18 allows insert 10 to hang onto the side of mower deck MD. In addition, similarly to when in the first position, flange 18 can attach to mower deck MD using any of a variety of mechanisms known in the art, including interlocking surface features, fasteners, or the like. Again, however, regardless of the method of attachment, flange 18 can help to retain insert 10 in place when it is located in the second position.

The present subject matter can be embodied in other forms without departure from the spirit and essential characteristics thereof. The embodiments described therefore are to be considered in all respects as illustrative and not restrictive. Although the present subject matter has been described in terms of certain preferred embodiments, other embodiments that are apparent to those of ordinary skill in the art are also within the scope of the present subject matter.

What is claimed is:

1. A combination grass discharge and mulch plug insert for a lawnmower comprising:
    a first end configured for engagement and communication with a discharge opening of a lawnmower, the first end configured for preventing discharge of grass clippings from the lawnmower; and
    a second end configured for engagement and communication with the discharge opening, the second end defining a passage for allowing discharge of grass clippings through the second end;
    the insert being reversible between a first position in which the first end is inserted into the discharge opening and prevents discharge of grass clippings from the lawnmower, and a second position in which the second end is attached to the discharge opening and allows discharge of grass clippings from the lawnmower through the second end.

2. The insert of claim 1, wherein the first end has a shaped surface that substantially matches the shape of an interior surface of a lawnmower blade housing.

3. The insert of claim 1, wherein when the insert is oriented in the first position, the insert passes through the discharge opening and is positioned at least partially within a lawnmower blade housing.

4. The insert of claim 1, wherein the passage of the second end comprises a discharge chute in communication with the second end for directing the discharge of grass clippings.

5. The insert of claim 4, wherein the discharge chute is formed in a central portion of the insert.

6. The insert of claim 5, wherein the discharge chute comprises a curved channel formed in the insert.

7. The insert of claim 1, further comprising a flange extending from the second end, wherein the flange is configured to connect the insert to a lawnmower housing in both the first position and the second position.

8. A method of converting a lawnmower between a mulching mode and a grass discharge mode, comprising:
   providing a mulch plug insert for a lawnmower comprising:
      a first end configured for engagement and communication with a discharge opening of a lawnmower, the first end configured for preventing discharge of grass clippings from the lawnmower; and
      a second end configured for engagement and communication with the discharge opening, the second end defining a passage for allowing discharge of grass clippings through the second end; and
      the insert being reversible between a first position in which the first end is inserted into the discharge opening and prevents discharge of grass clippings from the lawnmower, and a second position in which the second end is attached to the discharge opening and allows discharge of grass clippings from the lawnmower through the second end;
   attaching the mulch plug insert to a lawnmower in a first position where the first end engages a discharge chute of the lawnmower and discharge of grass clippings from the lawnmower is prevented by the first end of the mulch plug insert; and
   reversing the mulch plug insert to the second position by removing the mulch plug insert and attaching the second end of the mulch plug insert to the discharge chute where discharge of grass clippings from the lawnmower is allowed.

9. A lawnmower comprising:
   a lawnmower blade housing having an interior surface, the housing defining a discharge opening; and
   a combination grass discharge and mulch plug insert, the insert comprising a first end configured for engagement and communication with the discharge opening, the first end configured for preventing discharge of grass clippings from the lawnmower, and a second end configured for engagement and communication with the discharge opening, the second end defining a passage for allowing discharge of grass clippings through the second end;
   the insert being reversible between a first position in which the first end is inserted into the discharge opening and prevents discharge of grass clippings from the lawnmower, and a second position in which the second end is attached to the discharge opening and allows discharge of grass clippings from the lawnmower through the second end.

10. The lawnmower of claim 9, wherein the first end of the insert has a shaped surface that substantially matches a shape of the interior surface of the lawnmower blade housing.

11. The lawnmower of claim 9, wherein when the insert is oriented in the first position, the insert passes through the discharge opening and is positioned at least partially within the lawnmower blade housing.

12. The lawnmower of claim 9, wherein the passage of the second end of the insert comprises a discharge chute in communication with the second end for directing the discharge of grass clippings.

13. The lawnmower of claim 12, wherein the discharge chute is formed in a central portion of the insert.

14. The lawnmower of claim 12, wherein the discharge chute comprises a curved channel formed in the insert.

15. The lawnmower of claim 9, further comprising a flange extending from the second end of the insert, wherein the flange is configured to connect the insert to the lawnmower blade housing in both the first position and the second position.

16. The lawnmower of claim 15, wherein when the insert is in the first position, the flange is attached to the lawnmower blade housing beneath the discharge opening.

17. The lawnmower of claim 16, wherein when the insert is in the second position, the flange is attached to the lawnmower blade housing above the discharge opening.

18. The lawnmower of claim 9, wherein the insert is a one-piece component composed of a single material.

19. The lawnmower of claim 9, further comprising a flange extending from the insert configured to connect the insert to the lawnmower blade housing.

20. The lawnmower of claim 9, further comprising a cutting element disposed within the lawnmower blade housing.

* * * * *